United States Patent
Miyata et al.

(10) Patent No.: US 7,742,924 B2
(45) Date of Patent: Jun. 22, 2010

(54) SYSTEM AND METHOD FOR UPDATING INFORMATION FOR VARIOUS DIALOG MODALITIES IN A DIALOG SCENARIO ACCORDING TO A SEMANTIC CONTEXT

(75) Inventors: Ryosuke Miyata, Kawasaki (JP); Toshiyuki Fukuoka, Kawasaki (JP); Eiji Kitagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1161 days.

(21) Appl. No.: 10/952,807

(22) Filed: Sep. 30, 2004

(65) Prior Publication Data
US 2005/0256717 A1 Nov. 17, 2005

(30) Foreign Application Priority Data
May 11, 2004 (JP) .............................. 2004-141582

(51) Int. Cl.
*G06F 17/27* (2006.01)
*G10L 11/00* (2006.01)
*G10L 21/00* (2006.01)
(52) U.S. Cl. ............................. 704/275; 704/9; 704/270
(58) Field of Classification Search .................... 704/9, 704/270
See application file for complete search history.

(56) References Cited

U.S. PATENT DOCUMENTS

| | | | |
|---|---|---|---|
| 5,182,709 A * | 1/1993 | Makus | 704/9 |
| 5,239,617 A * | 8/1993 | Gardner et al. | 706/11 |
| 5,283,737 A * | 2/1994 | Van Praag | 704/9 |
| 5,623,609 A * | 4/1997 | Kaye et al. | 704/1 |
| 5,708,822 A * | 1/1998 | Wical | 704/1 |
| 5,864,844 A * | 1/1999 | James et al. | 707/4 |
| 6,513,006 B2 * | 1/2003 | Howard et al. | 704/257 |
| 6,598,018 B1 * | 7/2003 | Junqua | 704/251 |

(Continued)

FOREIGN PATENT DOCUMENTS

JP 7-104962 4/1995

(Continued)

OTHER PUBLICATIONS

Japanese Office Action dated Jul. 7, 2009 issued in corresponding Japanese Application No. 2004-141582 (5 pages) (and 5 pages of English translation).

*Primary Examiner*—David R Hudspeth
*Assistant Examiner*—Justin W Rider
(74) *Attorney, Agent, or Firm*—Staas & Halsey LLP

(57) ABSTRACT

The present invention provides a dialog system, a dialog execution method and a computer program which are capable of easily updating input information and output information of a dialog scenario and easily changing a plurality of modalities by using a general-purpose dialog scenario. In a dialog system that receives information from outside, controls the pursuit of dialog along the stored dialog scenario and outputs information along the dialog scenario to the outside, a dialog scenario written by using information for identifying the meaning of words/phrases used in the input information and the output information is stored, one or a plurality of words/phrases are stored in association with information for identifying the meaning of words/phrases, input information is analyzed, a corresponding word/phrase is extracted based on the derived information for identifying the meaning of words/phrases, and output information along a dialog scenario stored, based on the extracted word/phrase is outputted.

9 Claims, 17 Drawing Sheets

U.S. PATENT DOCUMENTS

| | | | |
|---|---|---|---|
| 6,629,087 B1 * | 9/2003 | Benson et al. | 706/11 |
| 2002/0042707 A1 * | 4/2002 | Zhao et al. | 704/9 |
| 2004/0044516 A1 * | 3/2004 | Kennewick et al. | 704/5 |
| 2004/0199375 A1 * | 10/2004 | Ehsani et al. | 704/4 |

FOREIGN PATENT DOCUMENTS

| | | |
|---|---|---|
| JP | 7-175496 | 7/1995 |
| JP | 8-234789 | 9/1996 |
| JP | 10-260976 | 9/1998 |
| JP | 11-24813 | 1/1999 |
| JP | 2003-108376 | 4/2003 |
| JP | 2003-140688 | 5/2003 |

* cited by examiner

FIG. 6

CONCEPT TABLE

| CONCEPT ID | WORD/PHRASE ID |
|---|---|
| tokyo_station | w0130240881 |
| tokyo_station | w0130001240 |
| pref_tokyo | w0130190311 |
| pref_tokyo | w0130001240 |

WORD/PHRASE TABLE

| WORD/PHRASE ID | REPRESENTATION | PRONUNCIATION FOR VOICE SYNTHESIS | VOICE RECOGNITION GRAMMARS |
|---|---|---|---|
| w0130001240 | Tokyo | To-kyo | Tokyo |
| w0130240881 | Tokyo station | To-kyo-e-ki | Tokyo-Eki |
| w0130190311 | Tokyo prefecture | To-kyo-to | Tokyo-To |

FIG. 8

```
<output>
<prompt><statement id="askWeather"/></prompt>
</output>
<input>
<selection>
    <item><concept id="akashi"/></item>
    <item><concept id="kobe"/></item>
    <item><concept id="osaka"/></item>
</selection>
</input>
```

FIG. 14

| CONCEPT ID | WORD/PHRASE INFORMATION ID |
|---|---|
| yes | w_yes_002 |
| tomorrow | w_tmrw_001 |

FIG. 15

| CONCEPT ID | WORD/PHRASE INFORMATION ID | NUMBER OF TIMES |
|---|---|---|
| yes | w_yes_001 | 2 |
| yes | w_yes_002 | 5 |
| yes | w_yes_003 | 0 |
| tomorrow | w_tmrw_001 | 14 |
| tomorrow | w_tmrw_002 | 2 |

FIG. 16

"Hai" | http://dialog_knowledge.org/common/ | yes

"Tokyo-Eki" | http://dialog.japanmap.co.jp/p/place/ | tokyo_station

SYSTEM AND METHOD FOR UPDATING INFORMATION FOR VARIOUS DIALOG MODALITIES IN A DIALOG SCENARIO ACCORDING TO A SEMANTIC CONTEXT

CROSS-REFERENCE TO RELATED APPLICATIONS

This non-provisional application claims priority under 35 U.S.C.§119(a) on Patent Application No. 2004-141582 filed in Japan on May 11, 2004, the entire contents of which are hereby incorporated by reference.

BACKGROUND OF THE INVENTION

The present invention relates to a dialog system, a dialog system execution method and a computer memory product which permits smooth communication of information between a computer and a user.

With the recent rapid improvement in the processing ability of computers and the popularization of communication environments such as the Internet, the users have increasing opportunities to acquire information through computers, and the computers have increasing opportunities to notify the users of information. Hence, it is urgent to develop dialog interfaces that allow not only engineers having a thorough knowledge of computers but also ordinary home users who are not necessarily familiar with computers to receive various information services while communicating with a computer.

A dialog system for providing various information services sets a dialog procedure corresponding to a specific service. Setting a dialog procedure for each individual service requires the developer of the dialog system to perform complicated work, and consequently the development cost of the dialog system increases. Nowadays, therefore, many dialog systems having a general-purpose dialog scenario applicable to a large number of services have been developed.

For example, user's input information inputted from an input unit and output information (screen or voice information) outputted to an output unit, and the system's processing procedure for the user's input information are written in a dialog scenario. By applying the dialog scenario to a plurality of services, there is no need to set a dialog procedure for each individual service.

Typical examples of languages for writing a dialog scenario include HTML that realizes a dialog using a screen, and VoiceXML that realizes a dialog using voice. Moreover, not only description languages for realizing a single modality, for example, a description language dealing with only the screen or voice, but also description languages such as X+V and SALT for realizing multi-modality including a combination of screen and voice, and description languages such as XISL extendable to applications other than screen and voice are used (see Japanese Patent Application Laid-Open No. 8-234789 (1996)).

A dialog scenario is composed of expression data representing expressions to be outputted to the user by the dialog system, recognition data for receiving an input from the user, and execution procedure data that is the procedure of executing an expression and an input. In the case of VoiceXML, for example, a prompt indicating a character string subjected to voice synthesis is written as expression data, a voice recognition grammar is written as recognition data, and the procedure of executing prompt output and voice recognition is written as execution procedure data.

BRIEF SUMMARY OF THE INVENTION

The present invention has been made with the aim of providing a dialog system, a dialog execution method and a computer memory product, which can easily update input information and output information in a dialog scenario and easily change a plurality of modalities by using a general-purpose dialog scenario.

In order to achieve the above object, a dialog system according to a first aspect of the invention is a dialog system including an information receiving section for receiving input information from outside; a dialog scenario storage section for storing a dialog scenario for pursuing a dialog; a dialog control section for controlling the pursuit of dialog along the stored dialog scenario; and an information output section for outputting output information along the dialog scenario to the outside, and characterized in that the dialog scenario storage section stores a dialog scenario written by using information for identifying the meaning of words/phrases used in the input information and the output information, the dialog system comprises: means for storing one or a plurality of words/phrases in association with information for identifying the meaning of words/phrases; means for analyzing the input information and deriving information for identifying the meaning of words/phrases; and means for extracting a corresponding word/phrase based on the derived information for identifying the meaning of words/phrases, and the information output section outputs output information along the dialog scenario stored, based on the extracted word/phrase by the means.

In the dialog system of the first aspect, a dialog scenario is written using identification information, for example, concept ID indicating the semantic content of a word/phrase to be used. Then, when input information from outside is received, the dialog system finds the concept ID by analyzing the received input information, and extracts an appropriate word/phrase corresponding to the found concept ID and outputs output information for the dialog to outside. Consequently, when writing a dialog scenario, there is no need to specifically determine a word/phrase that is expected to be input from outside. Moreover, by writing a dialog scenario, which can respond to any configuration of modalities, according to semantic content, it is possible to input and output appropriate information corresponding to the type of dialog modalities, and it is also possible to realize a dialog system allowing easy maintenance and updating work.

A dialog system according to a second aspect of the invention is based on the first aspect, and characterized in that templates for specifying fixed portions of output information to be outputted to the outside and changeable portions specified by information for identifying the meaning of words/phrases are stored in association with information for identifying the templates, and the information output section inserts words/phrases corresponding to the changeable portions of the templates, based on the information for identifying the templates and the information for identifying the meaning of words/phrases, and outputs output information along the dialog scenario.

The dialog system of the second aspect of the invention uses a template that divides information to be inputted from or outputted to the outside into fixed portions and changeable portions. The dialog system performs input/output of information along a dialog scenario based on information for identifying the template. Thus, it is sufficient to receive input information from each modality for the changeable portion of the template. Consequently, the computing burden for the process of analyzing the received input information can be reduced, and a dialog scenario can be written without depending on the types of modalities not only for words but also for the whole text. It is therefore possible to more flexibly change expressions and change modalities.

A dialog system according to a third aspect of the invention is based on the first aspect, and characterized in that history information about a history of a word/phrase selected from the plurality of words/phrases corresponding to the information for identifying the meaning of words/phrases is stored, in case that a plurality of words/phrases are stored in association with information for identifying the meaning of words/phrases, and a word/phrase corresponding to the information for identifying the meaning of words/phrases is selected based on the history information.

The dialog system of the third aspect stores the history information about the history of a word/phrase selected from a plurality of words/phrases corresponding to information for identifying the meaning of words/phrases, namely concept ID. A word/phrase corresponding to the concept ID is selected based on the history information. Consequently, for a word that can be said in a plurality of ways, the system's way of saying can be changed according to the past records of the way of saying used by the user.

For example, when the user inputs "tokyo disney land" for "disney land", it is possible to control the system to output "Tokyo Disney Land". Moreover, for a name written in Chinese characters that can be read in a plurality of ways, such as "Nagata" and "Osada", if word/phrase information having the sound "nagata" and word/phrase information having the sound "osada" are stored in association with the concept ID, when the user inputted "nagata" just before, the dialog system can output "Nagata, or when the user inputted "osada" just before, the dialog system can output "Osada".

A dialog system according to a fourth aspect of the invention is based on the third aspect, and characterized in that a word/phrase that is selected most recently is to be selected based on the history information.

In the dialog system of the fourth aspect, a word/phrase that was selected most recently is selected as a word/phrase corresponding to the concept ID, based on the history information. Therefore, for a semantic content that can be expressed in a plurality of ways, it is possible to change the system's way of saying according to a way of saying selected most recently by the user.

For example, when the user inputted "tokyo disney land" most recently for "disney land", it is possible to control the system to output "Tokyo Disney Land".

A dialog system according to a fifth aspect of the invention is based on the third aspect, and characterized in that a word/phrase that is selected the greatest number of times is to be selected based on the history information.

In the dialog system of the fifth aspect, a word/phrase that was selected the greatest number of times is extracted based on the history information. Therefore, for a semantic content that can be expressed in a plurality of ways, by giving a priority to a way of saying that is selected the greatest number of times by the user in the past and outputting this way of saying, it is possible to change the system's way of saying.

For example, when "tokyo disney land" is inputted the greatest number of times by the user for "disney land", it is possible to control the system to output "Tokyo Disney Land".

A dialog system according to a sixth aspect of the invention is based on any one of the first through fifth aspects of the invention, and characterized in that the system comprises means for determining a type of modality based on an analysis result of the received input information, and the means for extracting a word/phrase extracts a corresponding word/phrase based on the determined type of modality in addition to the derived information for identifying the meaning of words/phrases.

The dialog system of the sixth aspect determines a voice modality, a screen modality or another modality according to the input information. Then, a word/phrase corresponding to information for identifying the meaning of words/phrases is extracted based on the determined type of modality. Therefore, it is possible to extract an optimum word/phrase according to the type of modality and output the output information including, for example, information for changing the style between a colloquial expression and a literary expression.

A dialog execution method according to a seventh aspect of the invention is a dialog execution method including the steps of receiving input information from outside; storing a dialog scenario for pursuing a dialog; controlling the pursuit of dialog along the stored scenario; and outputting output information along the dialog scenario to the outside, and characterized in that a dialog scenario written using information for identifying the meaning of words/phrases used in the input information and the output information is stored, and the method comprises the steps of: storing one or a plurality of words/phrases in association with information for identifying the meaning of words/phrases; analyzing the input information and deriving information for identifying the meaning of words/phrases; extracting a corresponding word/phrase based on the derived information for identifying the meaning of words/phrases; and outputting output information along the dialog scenario stored, based on the extracted word/phrase.

In the dialog execution method of the seventh aspect, a dialog scenario is written using identification information, for example, concept ID indicating the semantic content of a word/phrase to be used. When input information is received from outside, the concept ID is found by analyzing the received input information, an appropriate word/phrase corresponding to the found concept ID is extracted, and output information for the dialog is outputted to the outside. Consequently, when writing a dialog scenario, there is no need to specifically determine a word/phrase that is expected to be input from outside. Moreover, by writing a general-purpose dialog scenario according to semantic content, it is possible to input and output appropriate information corresponding to the type of dialog modality, and it is also possible to realize a dialog system allowing easy maintenance and updating work.

A computer memory product according to an eighth aspect of the invention is a computer executable computer program including the steps of receiving input information from outside; storing a dialog scenario for pursuing a dialog; controlling the pursuit of dialog along the stored scenario; and outputting output information along the dialog scenario to the outside, and characterized in that a dialog scenario written using information for identifying the meaning of words/phrases used in the input information and the output information is stored, and the computer program comprises the steps of: storing one or a plurality of words/phrases in association with information for identifying the meaning of words/phrases; analyzing the input information and deriving information for identifying the meaning of words/phrases; extracting a corresponding word/phrase based on the derived information for identifying the meaning of words/phrases; and outputting output information along the dialog scenario stored, based on the extracted word/phrase.

According to the program stored in the computer memory product of the eighth aspect, a dialog scenario is written using information, for example, concept ID indicating the semantic content of a word/phrase to be used. When input information is received from outside, the concept ID is found by analyzing the received input information, an appropriate word/phrase corresponding to the found concept ID is extracted, and output information for the dialog is outputted to the outside. Consequently, by executing the program stored on the computer memory product, there is no need to specifically determine a word/phrase that is expected to be input from outside. Moreover, by writing a general-purpose dialog scenario according to the semantic content, it is possible to input and output appropriate information corresponding to the type of dialog modality, and it is also possible to realize a dialog system allowing easy maintenance and updating work.

The above and further objects and features of the invention will more fully be apparent from the following detailed description with accompanying drawings.

BRIEF DESCRIPTION OF THE SEVERAL VIEWS OF THE DRAWINGS

FIG. 6 is a view showing an example of the concept word/phrase database formed as a relational database.

FIG. 8 is a view showing an example of input and output information written in XML language in a dialog scenario.

FIG. 14 is a view showing examples of records stored in a word/phrase history database used in the dialog system of Embodiment 3 of the present invention.

FIG. 15 is a view showing examples of records stored in the word/phrase history database used in the dialog system of Embodiment 3 of the present invention.

FIG. 16 is a view showing an example of concept ID when sharing the concept word/phrase database.

DETAILED DESCRIPTION OF THE INVENTION

As described above, in a conventional dialog scenario, expression data, recognition data and execution procedure data are written in a united manner, and therefore there is a problem that it is difficult to change the contents of the respective pieces of data independently. In other words, expression data for providing output to individual modalities such as a voice modality and a screen modality, or recognition data for accepting input from individual modalities are directly embedded in a dialog scenario. Therefore, when updating only an input/output expression while maintaining the pursuit of dialog, or when changing a modality, it is necessary to modify the entire dialog scenario.

For example, in the case where a voice modality is used, pronunciation data for voice synthesis and grammar data for voice recognition are required for every word used in a dialog between the user and the system. On the other hand, in the case where a screen modality is used, the above-mentioned written representation data is necessary. Therefore, when performing the process of changing the way of saying or changing the dialect, it is necessary to extract the corresponding pronunciation data, grammar data and so on from the dialog scenario written in a description language and modify the data, and consequently a lot of work needs to be performed for the changing process. Moreover, in order to realize a multilingual function that supports a plurality of languages by using the same dialog scenario, it is necessary to include the pronunciation data and grammar data about all languages in the dialog scenario.

Further, like the process of recognizing a word inputted by voice and displaying the word on the screen and the process of reading a word selected on the screen by voice, it is difficult to realize the process of transmitting/receiving information between a plurality of modalities. In order to realize such a process, for example, every mutual conversion between data corresponding to respective modalities needs to be described in a dialog scenario. Therefore, if the number of modalities, the number of words and the number of dialog scenarios are extremely large, the description in a description language is extremely verbose, and there is a problem that it is difficult to deal with the changing of modalities.

The present invention has been made with the aim of solving the above problem, and it is an object of the present invention to provide a dialog system, a dialog execution method, and a program stored on a computer memory product, which are capable of easily updating input information and output information in a dialog scenario and easily changing a plurality of modalities by using a general-purpose dialog scenario. The present invention is embodied by the following embodiments.

Embodiment 1

Figure 1:
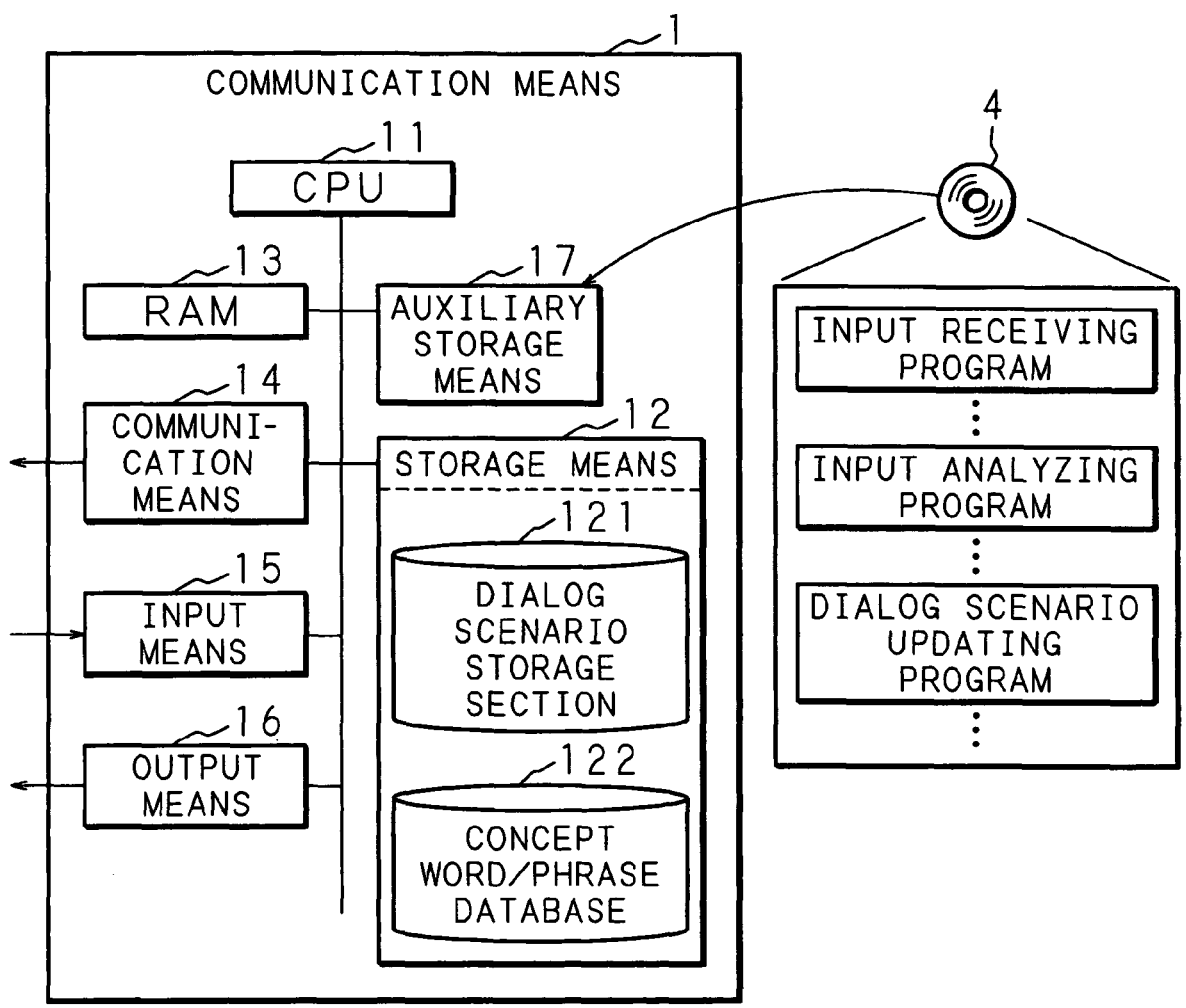
FIG. 1 is a block diagram showing a dialog control device of a dialog system according to Embodiment 1 of the present invention.

The following description will specifically explain a dialog system according to Embodiment 1 of the present invention based on the drawings. FIG. 1 is a block diagram showing a dialog control device 1 of a dialog system according to Embodiment 1 of the present invention. As shown in FIG. 1, the dialog system of Embodiment 1 is embodied by using the dialog control device 1 comprising input means for enabling voice input by a user and text input by pressing a keyboard, and output means for enabling output by voice and display of an image by a display device.

The dialog control device 1 comprises at least a CPU (central processing unit) 11, storage means 12, a RAM 13, communication means 14 connected to external communication means such as the Internet, input means 15, output means 16, and auxiliary storage means 17 using a removable memory product 4 such as a DVD and a CD.

The CPU 11 is connected to the above-mentioned hardware devices of the dialog control device 1 through an internal bus 18. The CPU 11 controls the above-mentioned hardware devices, and performs various software functions according to a processing program stored in the storage means 12, for example, a program for loading and executing a program as a program loader.

The storage means 12 is composed of a built-in fixed type storage device (hard disk), a ROM, etc. The storage means 12 obtains a necessary processing program from an external computer through the communication means 14, or the removable memory product such as a DVD or a CD-ROM. The storage means 12 stores a dialog scenario storage section 121 storing a dialog scenario that controls a dialog, and a concept word/phrase database 122 storing word/phrase information corresponding to concept ID that is information identifying the semantic content of words/phrases as a database. Note that a dialog scenario stored in the dialog scenario storage section 121 is written in a predetermined description language using concept ID. When executing a dialog, a dialog scenario is read by the CPU 11 and developed on the RAM 13.

The RAM 13 is composed of an SRAM, a flash memory, etc. The RAM 13 stores temporary data generated when software is executed. The communication means 14 is connected to the internal bus 18, and transmits/receives data necessary for processing by being connected to a cable of such as a LAN and a WAN.

The input means 15 varies depending on the types of modalities. For example, for a voice modality, the input means 15 is a microphone or the like for inputting voice of the user, whereas, for a screen modality, the input means 15 is a pointing device such as a mouse for selecting a word displayed on the screen, or a keyboard for inputting text data on the screen by pressing the keys.

Similarly, the output means 16 varies depending on the types of modalities. For example, for a voice modality, the output means 16 is a speaker for outputting synthesized voice to the user, whereas, for a screen modality, the output means 16 is a display device, such as a liquid crystal display device (LCD) and a CRT display, for displaying and outputting an image to the user.

The auxiliary storage means 17 uses a removable memory product 4 such as a CD and a DVD. The auxiliary storage means 17 downloads programs and data to be processed by the CPU 11 into the storage means 12. Moreover, the auxiliary storage means 17 can write the data processed by the CPU 11 for backup.

Figure 2:
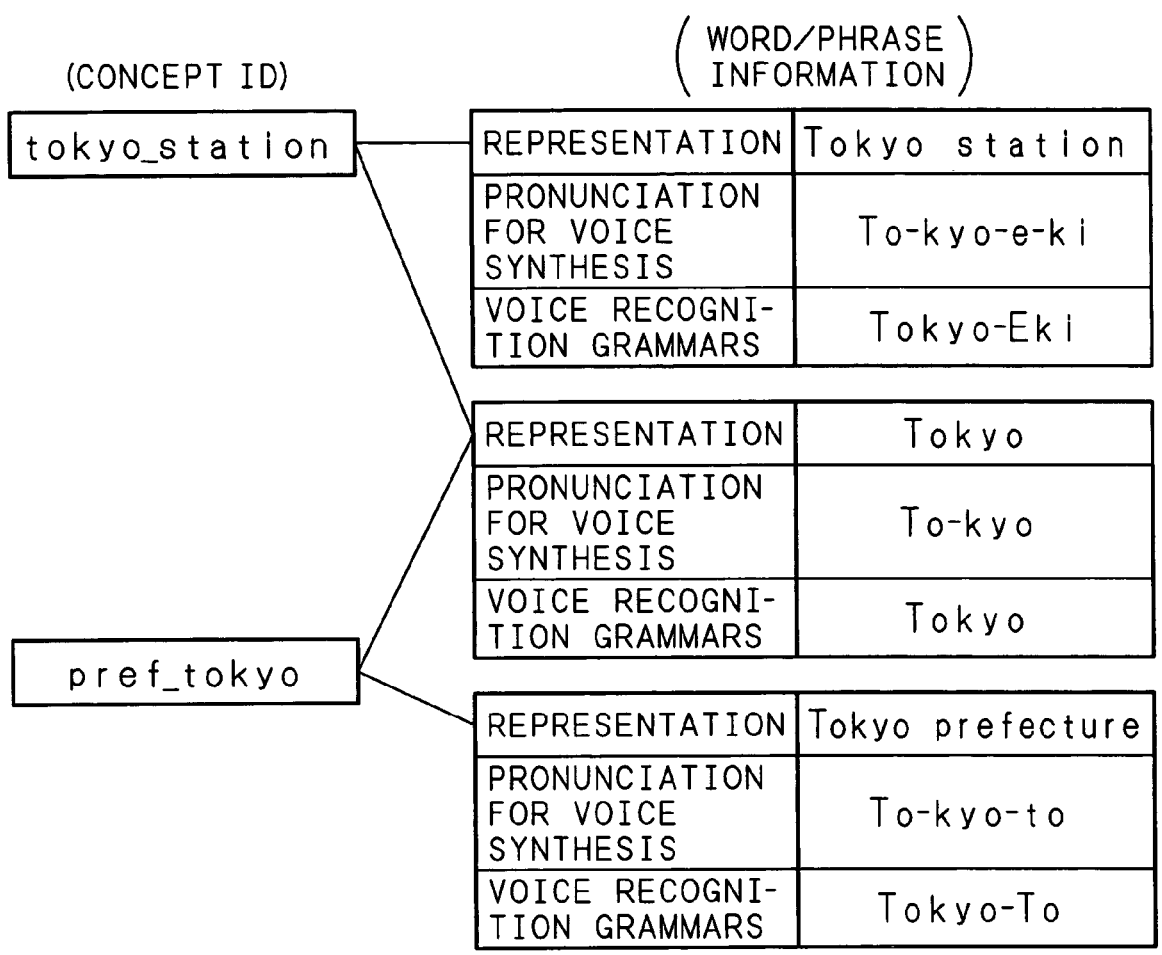
FIG. 2 is a view showing examples of records stored in a concept word/phrase database used in the dialog system of Embodiment 1 of the present invention.

The following description will explain the operation of the dialog system using the dialog control device 1 having the above-described structure. FIG. 2 is a view showing examples of records stored in the concept word/phrase database 122 used in the dialog system of Embodiment 1 of the present invention.

In the concept word/phrase database 122, the semantic content of a word/phrase, particularly concept ID that is information identifying semantic content in a dialog scenario stored in the dialog scenario storage section 121, and word/phrase information that is information about a word/phrase to be outputted to the output means 16 by using the dialog scenario are stored in association with each other. The concept ID is not particularly limited if it is ID capable of identifying the semantic content of a word/phrase as one meaning.

It may also be possible to store a plurality of pieces of word/phrase information in association with one piece of concept ID. For example, as shown in FIG. 2, for the concept ID "tokyo_station" representing Tokyo Station, there may be the written representation "tokyo" in addition to the written representation "tokyo station". Therefore, these two pieces of word/phrase information are stored in association with the concept ID "tokyo_station". Moreover, there may be a case where one piece of word/phrase information corresponds to a plurality of pieces of concept ID. The above-mentioned written representation "tokyo" is also associated with the concept ID "pref_tokyo" representing Tokyo prefecture.

In the word/phrase information, various data can be stored according to the structure of an actual dialog system. For example, if the dialog system has a modality using a screen and voice, written representations, pronunciation for voice synthesis, and voice recognition grammars are necessary. Therefore, as shown in FIG. 2, a written representation, pronunciation for voice synthesis and a voice recognition grammar are stored as a set of data of word/phrase information in association with concept ID. Consequently, it is possible to extract necessary data according to the type of modality.

Figure 3:
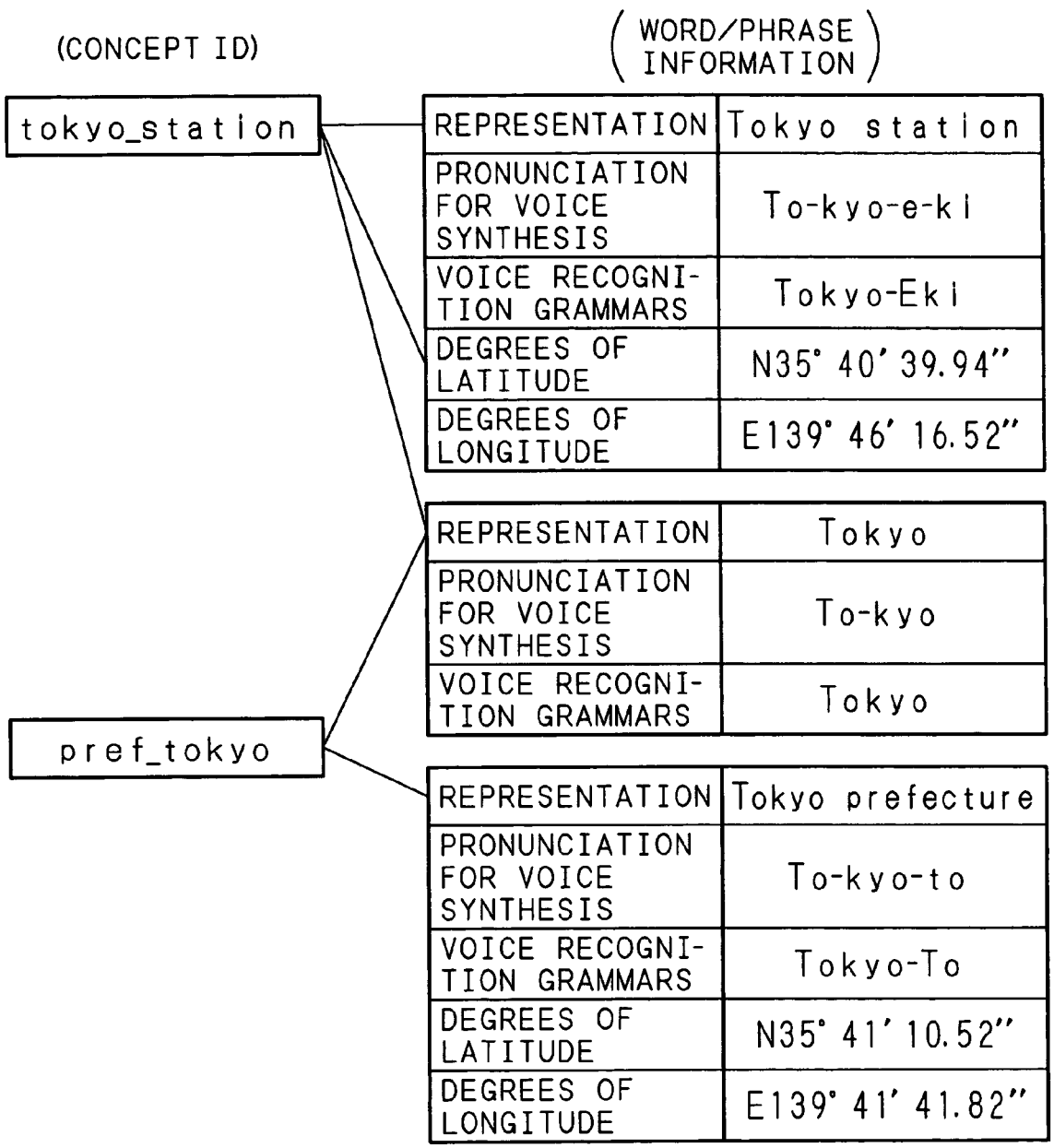
FIG. 3 is a view showing examples of records stored in the concept word/phrase database when an apparatus using map information is used as one modality.

Further, in the case where an apparatus using map information, such as a vehicle navigation system, is used as one modality, for example, it is necessary to store information about latitude and longitude as word/phrase information in association with concept ID representing a location. FIG. 3 is a view showing examples of records stored in the concept word/phrase database 122 when an apparatus using map information is used as one modality. As shown in FIG. 3, the information about latitude and longitude is stored as word/phrase information for the concept ID "tokyo_station" and "pref_tokyo" representing locations.

Figure 4:
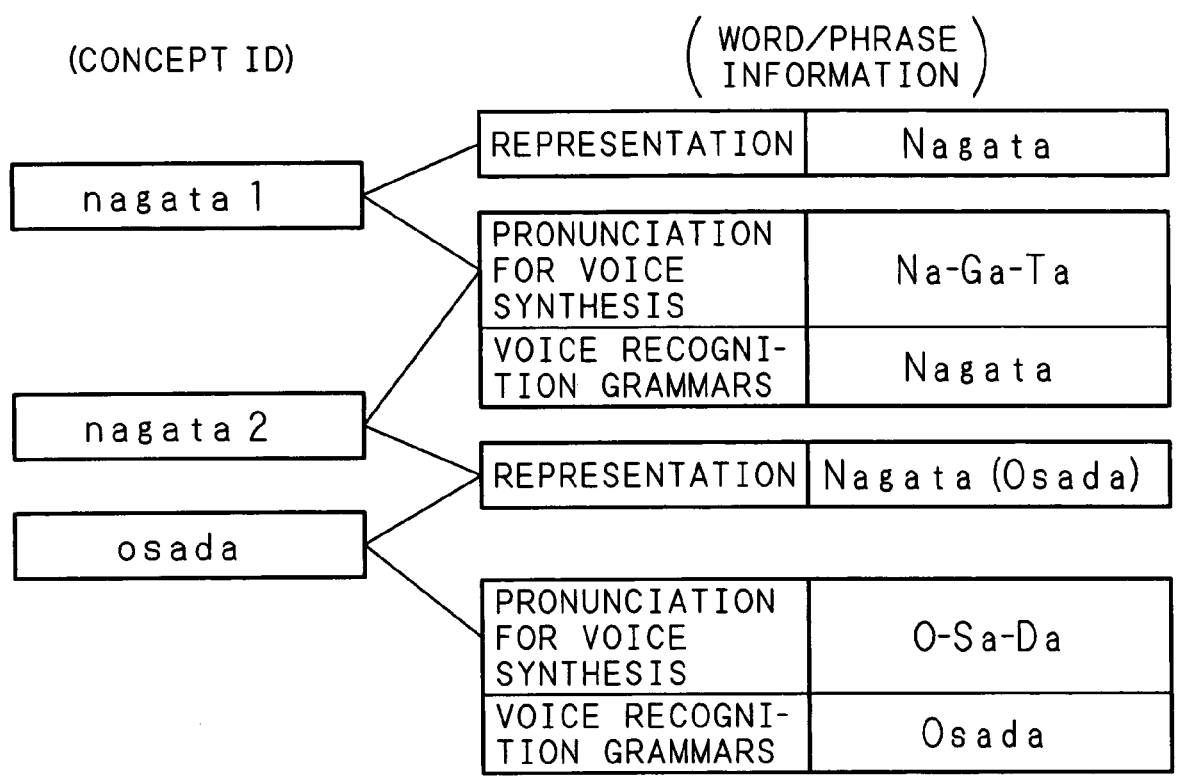
FIG. 4 is a view showing examples of records stored in the concept word/phrase database when word/phrase information such as written representations, pronunciation for voice synthesis and voice recognition grammars is stored as individual data.

Besides, the word/phrase information such as a written representation, pronunciation for voice synthesis and voice recognition grammar may be stored as individual data instead of one set of data. FIG. 4 is a view showing examples of records stored in the concept word/phrase database 122 when word/phrase information such as written representations, pronunciation for voice synthesis and voice recognition grammars is stored as individual data.

For example, when dealing with the names of persons "Nagata", "Nagata" (which is written using a different Chinese characters from the former "Nagata"), and "Osada" (which is written using the Chinese characters the same with the second "Nagata" but different in their pronunciation) by the dialog system, different concept ID is assigned to each of them. However, the pronunciation for voice synthesis and the voice recognition grammar for the two "Nagata" and "Nagata" are the same, and the written representations of the former "Nagata" and "Osada" by Chinese characters are the same. Therefore, as shown in FIG. 4, each of the written representation, pronunciation for voice synthesis and voice recognition grammar is stored as individual word/phrase information in association with the concept ID.

Figure 5A:
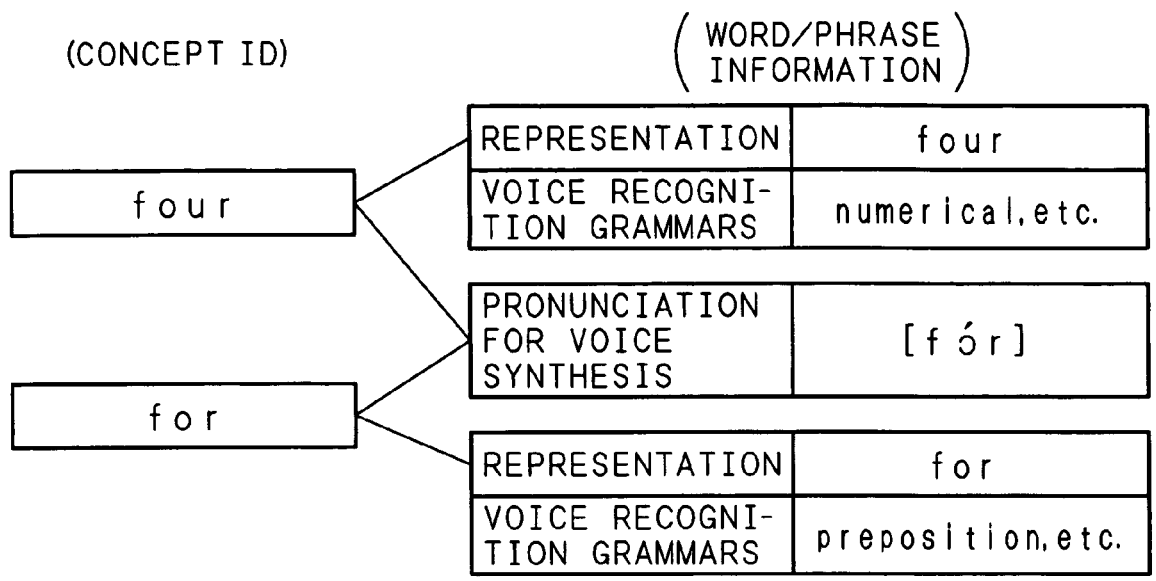
FIGS. 5A and 5B are views showing other examples of records stored in the concept word/phrase database when word/phrase information such as written representations, pronunciation for voice synthesis and voice recognition grammars is stored as individual data.
Figure 5B:
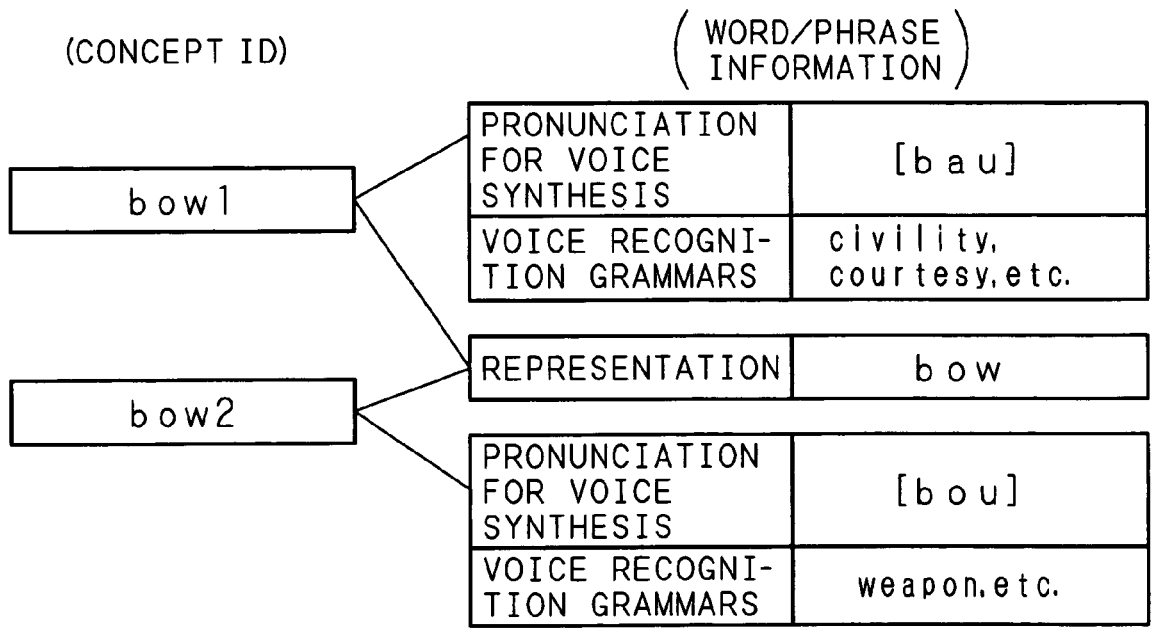

Note that the records stored in the concept word/phrase database 122 are not limited to words/phrases which are homonyms and homographs as shown in FIG. 4. FIGS. 5A and 5B are views showing other examples of records stored in the concept word/phrase database 122 when word/phrase information such as written representations, pronunciation for voice synthesis and voice recognition grammars is stored as individual data.

FIG. 5A shows one example of records of homonyms such as "four" and "for", for example. In this case, similarly to FIG. 4, different concept ID is assigned to each of these words. However, the words "four" and "for" have the same pronunciation for voice synthesis. Therefore, as shown in FIG. 5A, each of the written representation, pronunciation for voice synthesis, and voice recognition grammar is stored as individual word/phrase information in association with the concept ID.

FIG. 5B shows one example of records of homographs such as "bow" (an act of bending forward the head) and "bow" (a weapon for shooting arrows), for example. In this case, similarly to FIG. 4, different concept ID is assigned to each of these words. However, these two words "bow" and "bow" have the same written representation. Therefore, as shown in FIG. 5B, each of the written representation, pronunciation for voice synthesis, and voice recognition grammar is stored as individual word/phrase information in association with the concept ID.

The above-described concept word/phrase database 122 can be realized by a relational database, for example. FIG. 6 is a view showing an example of the concept word/phrase database 122 formed as a relational database. As shown in FIG. 6, the concept word/phrase database 122 can be realized by a concept table having concept ID and word/phrase ID as fields, and a word/phrase table having word/phrase ID and word/phrase information elements (generally, written representation, pronunciation for voice synthesis and voice recognition grammar) as fields. Of course the concept word/phrase database 122 is not limited to a relational database, and any database can be used if the database can store similar data structures and can be searched based on concept ID, word/phrase information, etc.

Figure 7:
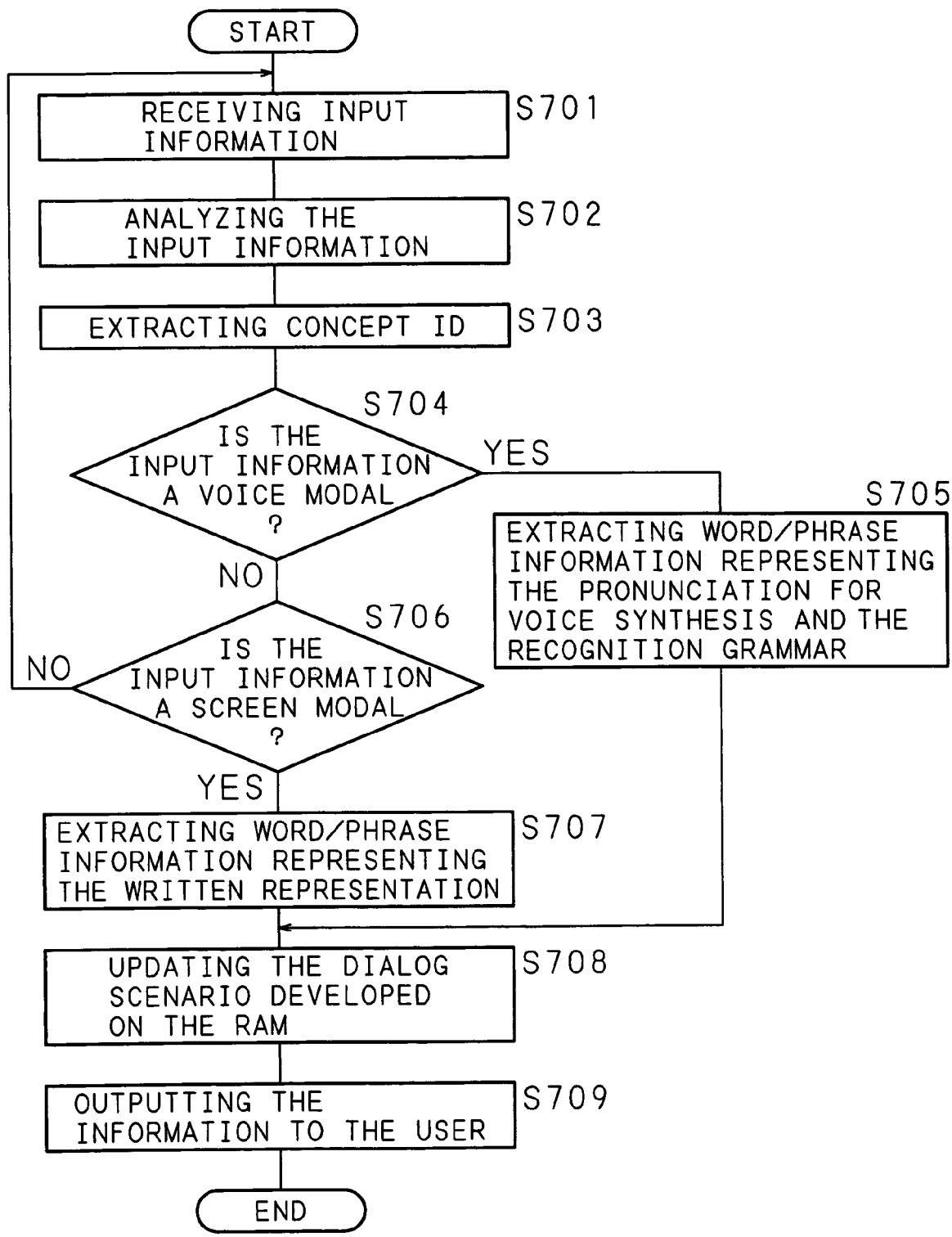
FIG. 7 is a flowchart showing the operating procedure of the CPU in the dialog control device of the dialog system of Embodiment 1 of the present invention.

FIG. 7 is a flowchart showing the operating procedure of the CPU 11 in the dialog control device 1 of the dialog system according to Embodiment 1 of the present invention. FIG. 7 is explained on the assumption that a dialog scenario is read from the dialog scenario storage section 121 and developed on the RAM 13, and the dialog system is in a state of waiting for input from the user.

The CPU 11 receives input information from the input means (step S701), and analyses the received input information to find the semantic content of the input information (step S702). The CPU 11 refers to the concept word/phrase database 122 based on the analysis result, and converts the received input information into concept ID (step S703). For example, if it is analyzed that the received input information is represented by a written representation, word/phrase information matching the written representation of the received input information is extracted from the concept word/phrase database 122, and concept ID corresponding to the matched word/phrase information is extracted.

Note that in the case where a plurality of pieces of concept ID are stored in association with one word/phrase information, only one concept ID or every corresponding concept ID may be extracted as candidates.

The CPU 11 judges whether or not a modality that has received the input information from the user is a voice modality, based on the analysis result (step S704). If the CPU 11 judges that the modality that has received the input information from the user is a voice modality (step S704: YES), the CPU 11 uses the converted concept ID and extracts word/phrase information representing the pronunciation for voice synthesis and recognition grammar as specific word/phrase information from the concept word/phrase database 122 (step S705). The CPU 11 creates the system's speech content using the extracted word/phrase information representing the pronunciation for voice synthesis, and creates a recognition grammar by using the word/phrase information representing the voice recognition grammar.

If the CPU 11 judges that the modality that has received the input information from the user is not a voice modality (step S704: NO), the CPU 11 judges whether or not the modality that has received the input information from the user is a screen modality, based on the analysis result (step S706). If the CPU 11 judges that the modality that has received the input information from the user is a screen modality (step S706: YES), the CPU 11 uses the converted concept ID and extracts word/phrase information representing the written representation as specific word/phrase information from the concept word/phrase database 122 (step S707). The CPU 11 creates the display content by using the extracted word/phrase information representing the written representation.

The CPU 11 updates the dialog scenario developed on the RAM 13 by using the system's speech content, recognition grammar, or display content created based on the extracted word/phrase information representing the pronunciation and recognition grammar, or the word/phrase information representing the written representation (step S708). In other words, by substituting the concept ID portion in the dialog scenario written using the concept ID with the extracted word/phrase information, it is possible to convert the dialog scenario into a dialog scenario that can communicate with the user on the RAM 13. After the conversion of the dialog scenario, the CPU 11 outputs information for pursuing the dialog to the user by means of the system's speech or display (step S709). When the output of the information is completed, the CPU 11 turns into a state of waiting for input from the user.

In the case where a plurality of modalities are used (hereinafter referred to as the "multi-modalities"), for example, if the modality is a voice-screen multi-modalities, the word/phrase information extracted by the modality that has received the input information is not changed. For example, all word/phrase information representing the pronunciation for voice synthesis, recognition grammar and written representation is extracted, and the input information and output information in the dialog scenario are updated according to the type of the input means 16. Consequently, for example, it is possible to realize the process of repeating by voice an input by the user from the screen at the same time the input is displayed on the screen, or conversely the process of updating the screen at the same time the system responds by voice to the voice input.

FIG. 8 is a view showing an example of input and output information written in XML language in a dialog scenario. Each modality extracts necessary portions from the input/output information and uses them. For example, in the case of a voice modality, the contents of a prompt shown in FIG. 8 are included in a prompt (<prompt>) of VoiceXML, and each <item> in <selection> is included as an input candidate in the recognition grammar (<grammar>). Further, a written representation and a recognition grammar are extracted from <statement> and <concept>, respectively, and the information is converted into a word/phrase. The contents of <selection> may also be included in the prompt and read the candidates may be read aloud. In this case, the pronunciation is extracted from <concept> and used.

On the other hand, in the case of a screen modality, the contents of the prompt are treated as the heading of a page, and the contents of <selection> are used as selectable candidates for a selection box. In this case, written representations are used for all <statement> and <concept>.

As clear from the above-described examples, it is possible to add or delete a modality regardless of a dialog scenario, and each modality can output data in a form appropriate for each modality.

Note that the dialog scenario storage section 121 and the concept word/phrase database 122 may be stored on the same computer as the dialog control device 1, or stored on another computer accessible over a network.

As described above, according to Embodiment 1, when writing a dialog scenario, there is no need to specifically determine a word/phrase that is expected to be input from outside. Moreover, by writing a general-purpose dialog scenario according to a semantic content, it is possible to input and output appropriate information corresponding to the type of dialog modality, and it is also possible to realize a dialog system allowing easy maintenance and updating work.

Embodiment 2

Figure 9:
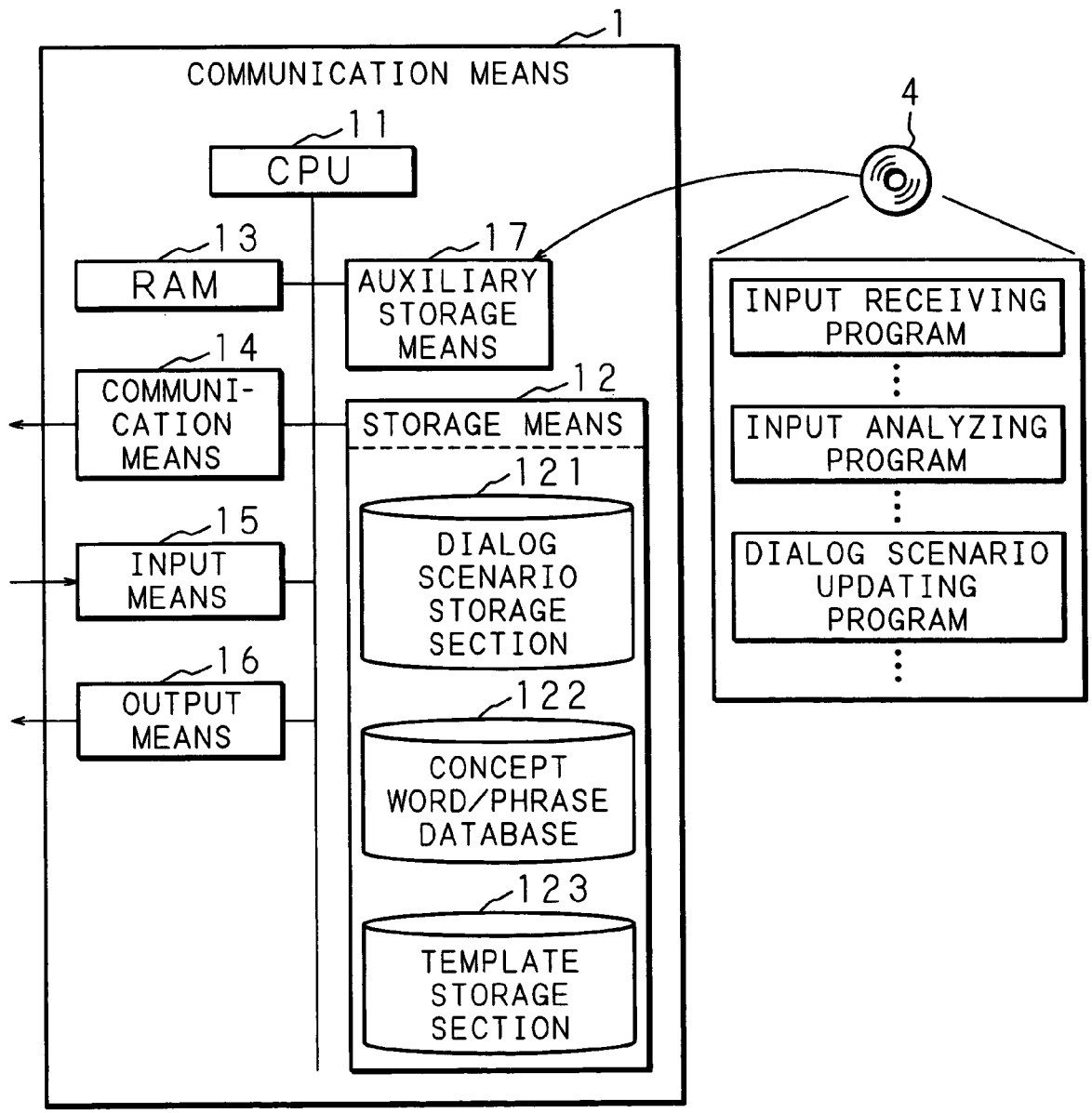
FIG. 9 is a block diagram showing a dialog control device of a dialog system according to Embodiment 2 of the present invention.

The following description will specifically explain a dialog system according to Embodiment 2 of the present invention based on the drawings. FIG. 9 is a block diagram showing a dialog control device 1 used in a dialog system of Embodiment 2. Since the structure of the dialog control device 1 used in the dialog system of Embodiment 2 is the same as that of Embodiment 1, the detailed explanation thereof is omitted by assigning the same codes. Embodiment 2 is characterized by using templates.

Figure 10:
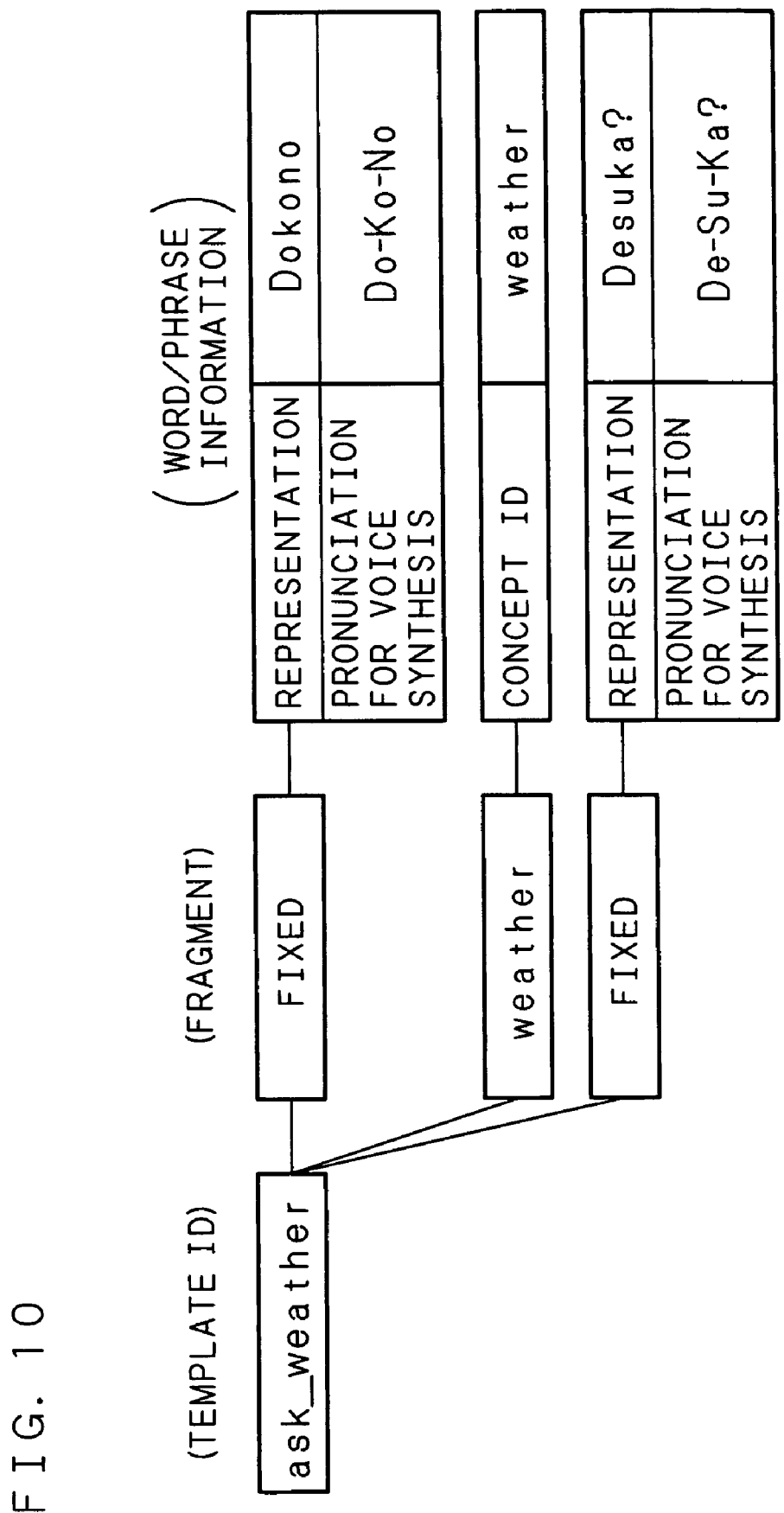
FIG. 10 is a view showing examples of records stored in a template storage section in the dialog system of Embodiment 2 of the present invention.

Templates used in the dialog system of Embodiment 2 of the present invention are stored in a template storage section 123 of the storage means 12. FIG. 10 is a view showing examples of records stored in the template storage section 123 in the dialog system of Embodiment 2 of the present invention. As shown in FIG. 10, a template is composed of template ID that is information identifying the template, and template information corresponding to the template.

The template information is defined by, for example, a plurality of fragments and word/phrase information associated with each fragment. The fragments are classified into fixed fragments and variable fields, and word/phrase information that can correspond to the type of modality is stored in association with a fixed fragment.

On the other hand, field ID that is identification information is given to a variable field, and concept ID is stored in association with the field ID. Thus, when the CPU 11 refers to the template storage section 123 based on template ID, it is possible to easily find which field ID the received input corresponds to and easily extract the concept ID corresponding to the input.

In the case where templates are used, a dialog scenario is written using template ID, field ID, and concept ID. When a dialog is started, the CPU 11 in the dialog control device 1 develops the dialog scenario on the RAM 13.

Figure 11:
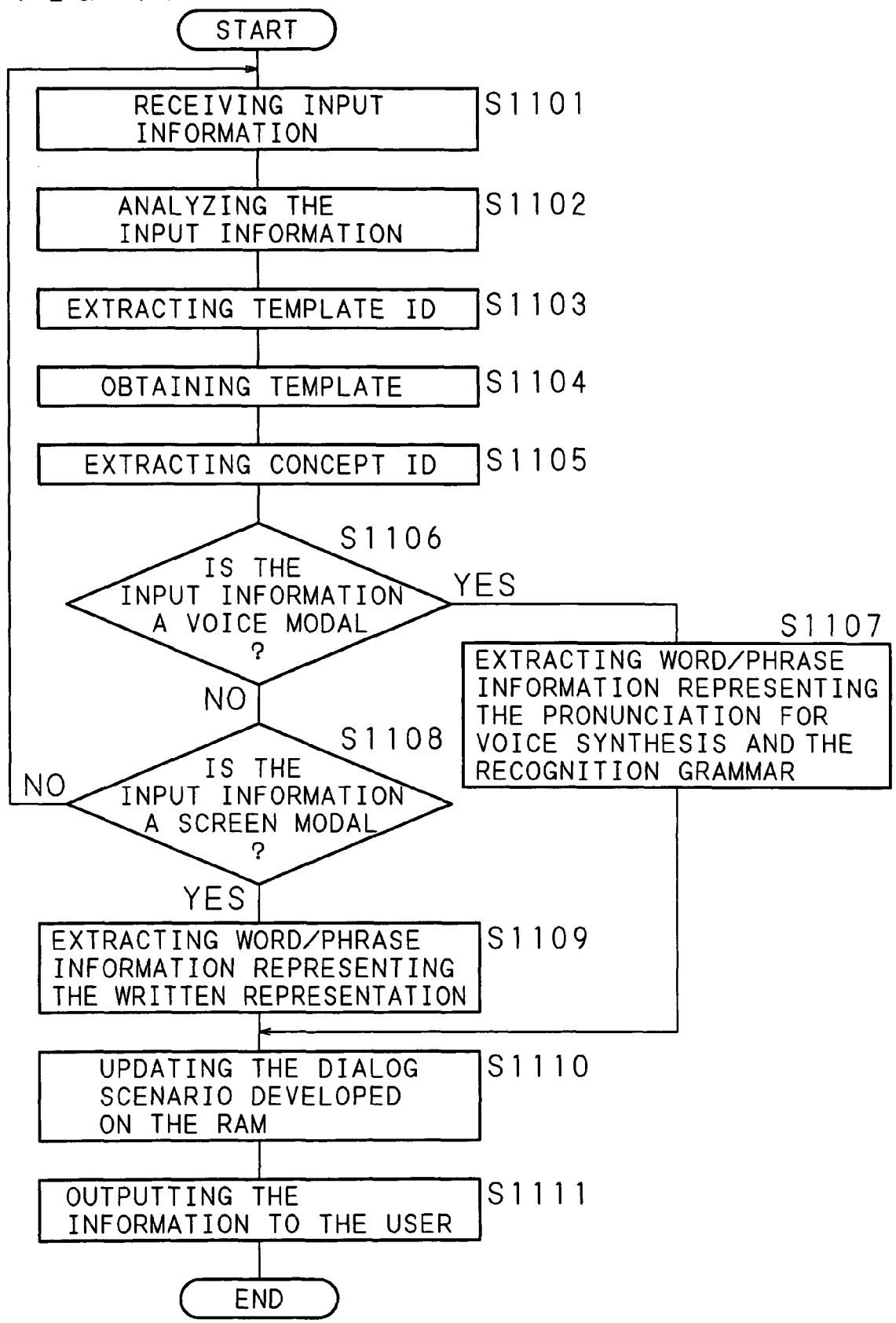
FIG. 11 is a flowchart showing the operating procedure of the CPU in the dialog control device of the dialog system of Embodiment 2 of the present invention.

FIG. 11 is a flowchart showing the operating procedure of the CPU 11 in the dialog control device 1 of the dialog system according to Embodiment 2 of the present invention. FIG. 11 is explained on the assumption that a dialog scenario is read from the dialog scenario storage section 121 and developed on the RAM 13, and the dialog system is in a state of waiting for input from the user.

The CPU 11 receives input information from the input means 15 (step S1101), analyses the received input information (step S1102), and extracts template ID (step S1103). The CPU 11 refers to the template information storage section 123 based on the extracted template ID to obtain a template (step S1104).

Based on the obtained template, the CPU 11 extracts concept ID corresponding to the field ID (step S1105), and then judges whether or not a modality that has received the input information from the user is a voice modality (step S1106).

If the CPU 11 judges that the modality that has received the input information from the user is a voice modality (step S1106: YES), the CPU 11 extracts word/phrase information representing the pronunciation for voice synthesis and recognition grammar as specific word/phrase information from the concept word/phrase database 122, based on the extracted concept ID (step S1107). The CPU 11 creates the system's speech content using the extracted word/phrase information representing the pronunciation for voice synthesis, and creates a recognition grammar by using the word/phrase information representing the voice recognition grammar.

If the CPU 11 judges that the modality that has received the input information from the user is not a voice modality (step S1106: NO), the CPU 11 judges whether or not the modality that has received the input information from the user is a screen modality (step S1108). If the CPU 11 judges that the modality that has received the input information from the user is a screen modality (step S1108: YES), the CPU 11 extracts word/phrase information representing the written representation as specific word/phrase information from the concept word/phrase database 122, based on the extracted concept ID (step S1109). The CPU 11 creates the display content by using the extracted word/phrase information representing the written representation.

The CPU 11 updates the dialog scenario developed on the RAM 13 by using the system's speech content, recognition grammar, or display content created based on the extracted word/phrase information representing the pronunciation of voice synthesis and recognition grammar, or word/phrase information representing the written representation (step S1110). In other words, by substituting the variable field included in the template with the extracted word/phrase information, it is possible to convert the dialog scenario into a dialog scenario that can communicate with the user on the RAM 13. After the conversion of the dialog scenario, the CPU 11 outputs information for pursuing the dialog to the user by means of the system's speech or display (step S111). When the output of the information is completed, the CPU 11 turns into a state of waiting for input from the user.

Figure 12:
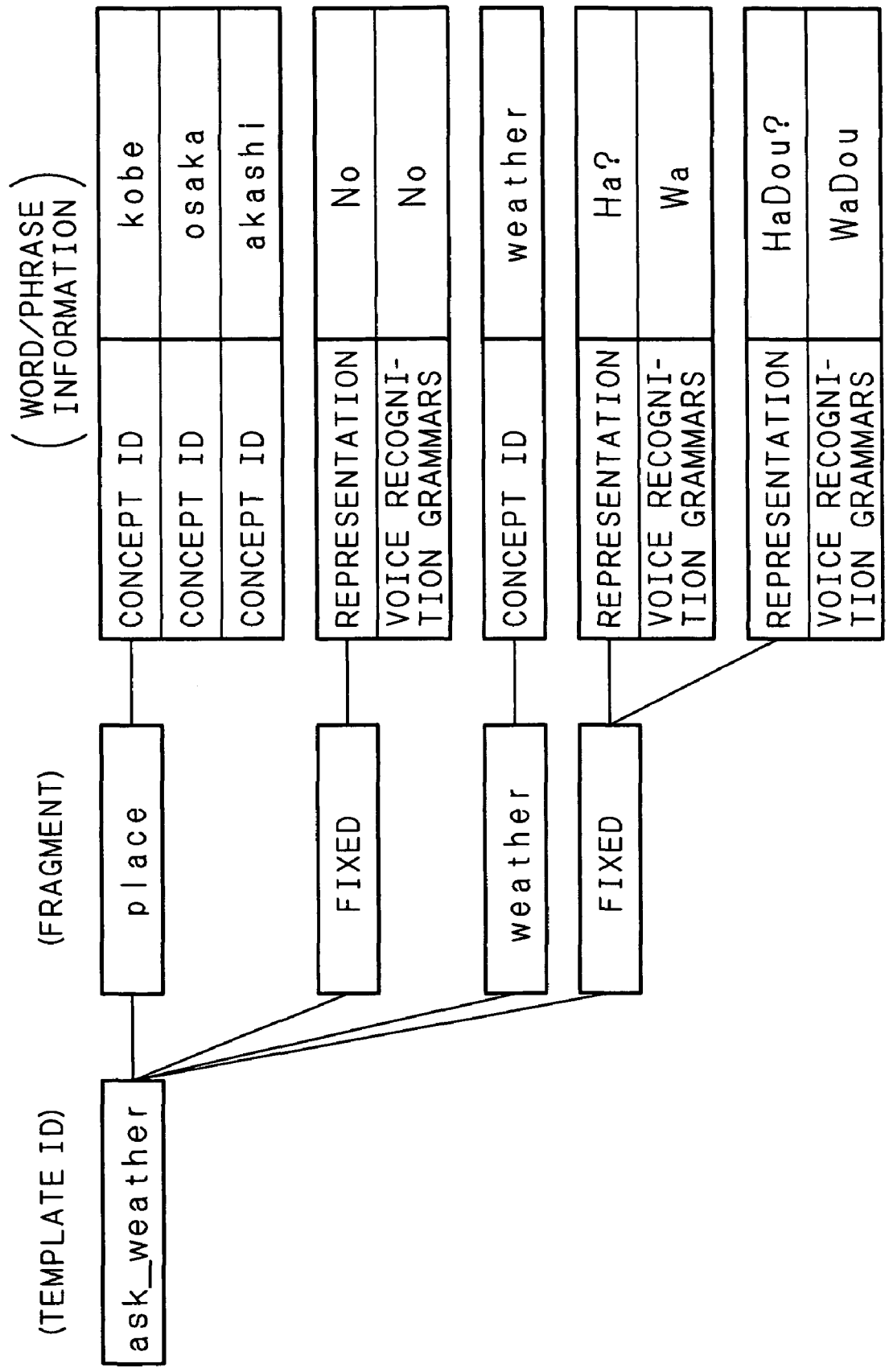
FIG. 12 is a view showing other examples of records stored in the template information storage section.

FIG. 12 is a view showing other examples of records stored in the template information storage section 123 used in the dialog system. FIG. 12 supposes that the template "How is ○ in ○?" (○ represents a variable field), and the variable field "the weather" is associated with the concept ID "the weather" in advance. Further, the concept ID "kobe", "osaka" and "akashi" are associated with the variable field "place". If the CPU 11 extracts word/phrase information representing a recognition grammar among word/phrase information corresponding to the concept ID "kobe", "osaka" and "akashi", it is possible to create a recognition grammar for receiving three inputs "How is the weather in Kobe?", "How is the weather in Osaka?", and "How is the weather in Akashi?".

Moreover, by associating a plurality of word/phrase information with a fixed fragment corresponding to "How is" in the head of a sentence (at the end of a sentence in Japanese), it is also possible to receive inputs with different words in the head of the sentence (at the end of a sentence in Japanese), such as, for example, "How is the whether in Kobe?".

As described above, according to Embodiment 2, since it is sufficient to receive information for only changeable portions in a template from each modality, it is possible to reduce the computing burden for the process of analyzing the received information. Moreover, since a dialog scenario can be written without depending on the types of modalities not only for words, but also for the entire text, it is possible to more flexibly change expressions and change modalities.

Besides, it is preferred that the concept word/phrase database 122 and the template information storage section 123 can be replaced according to the way of saying, dialect and so on. In Embodiment 2, for a dialog scenario having the same concept ID and template ID, it is possible to easily combine a different concept word/phrase database 122 and template information storage section 123. Consequently, it is possible to switch the way of saying, dialect and so on without modifying the dialog scenario.

Note that the present invention is not limited to the structure where the dialog control device 1 incorporates the concept word/phrase database 122 and the template information storage section 123 as described above, and alternatively, the concept word/phrase database 122 and the template information storage section 123 may be stored on another computer accessible over a network.

Further, the structure of the template information is not limited to the structure where fragments are arranged in series as described above, and the template information may have a tree structure having branches, or a more complex structure using the construction of a natural language.

Embodiment 3

Figure 13:
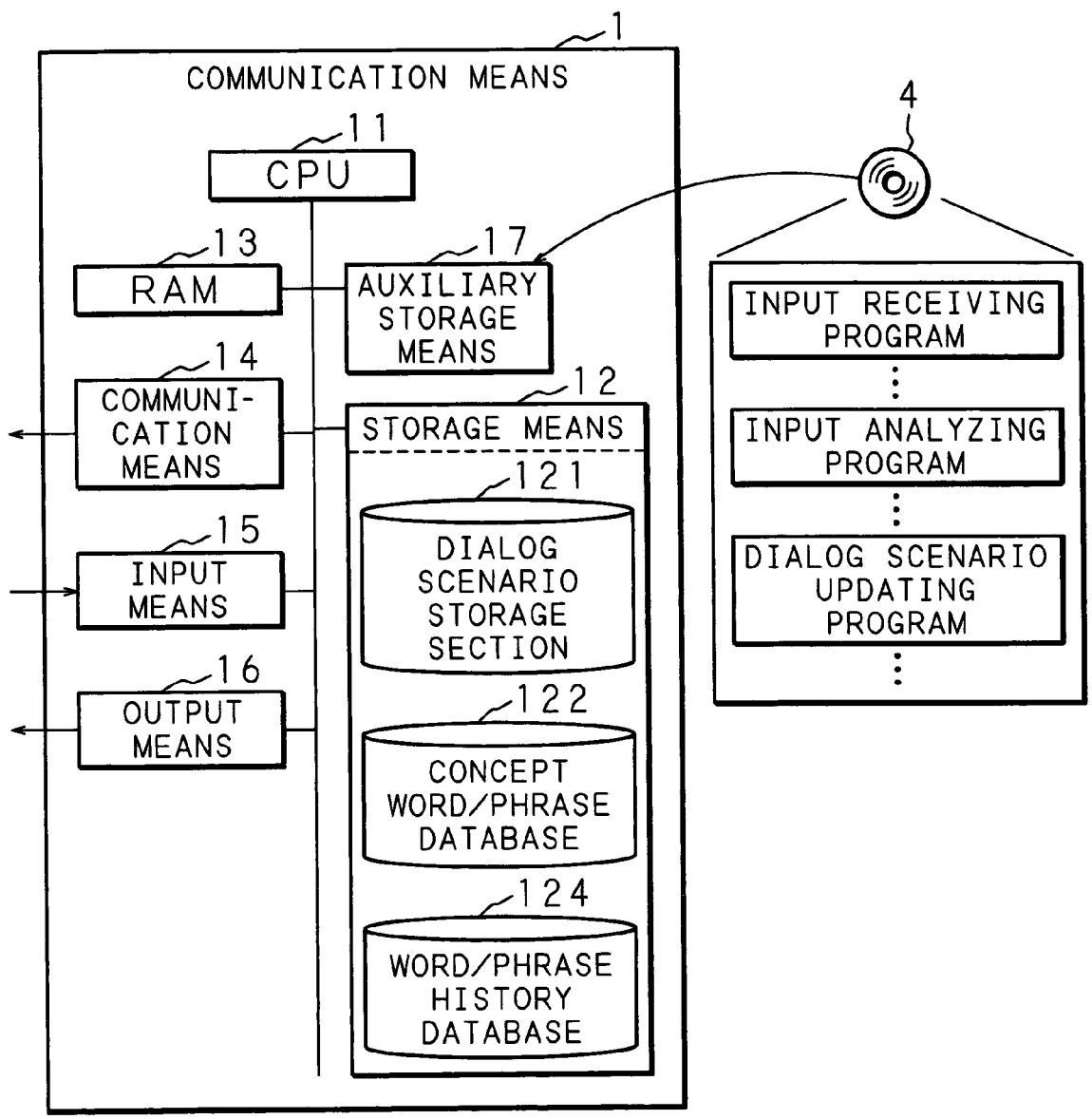
FIG. 13 is a block diagram showing a dialog control device of a dialog system according to Embodiment 3 of the present invention.

The following description will specifically explain a dialog system according to Embodiment 3 of the present invention based on the drawings. FIG. 13 is a block diagram showing a dialog control device 1 used in a dialog system of Embodiment 3. Since the structure of the dialog control device 1 of the dialog system of Embodiment 3 are the same as that of Embodiment 1, the detailed explanation thereof is omitted by assigning the same codes. Embodiment 3 is characterized in that the storage means 12 has a word/phrase history database 124 which, when concept ID is extracted based on an input received by the input means 15, records which word/phrase information among a plurality of pieces of word/phrase information corresponding to the concept ID is extracted.

FIG. 14 and FIG. 15 are views showing examples of records stored in the word/phrase history database 124 used in the dialog system of Embodiment 3 of the present invention. As shown in FIG. 14, word/phrase information ID is given to each of the most recently extracted word/phrase information, and word/phrase information having one meaning is stored in association with concept ID. Alternatively, as shown in FIG. 15, for example, the number of times the phase information is extracted may be stored for each word/phrase information ID extracted in association with the concept ID.

With the use of the word/phrase history database 124, the CPU 11 can more appropriately select word/phrase information to be extracted to update the dialog scenario. In the case where the word/phrase history database 124 stored in the record form shown in FIG. 14 is used, for example, speech content is created using the word/phrase information extracted last. More specifically, when the CPU 11 receives the input of a Japanese word equivalent to "tomorrow" which has a plurality of pronunciations in Japanese, namely "asu" and "ashita" (word/phrase information), the CPU 11 creates a recognition grammar capable of recognizing both "asu" and "ashita" by using all the word/phrase information. If the word/phrase information extracted for the creation of a dialog scenario by the CPU 11 is "ashita", the CPU 11 stores word/phrase information ID corresponding to the word/phrase information "ashita" in the word/phrase history database 124 in association with the concept ID.

Accordingly, if the CPU 11 generates output information having content to instruct repeating the input content, the CPU 11 refers to the word/phrase history database 124, and can extract the word/phrase information representing "ashita" for the concept ID representing "tomorrow" and create speech content to be outputted.

Further, by using the word/phrase history database 124 stored in the record form shown in FIG. 15, it is also possible to update the dialog scenario by using word/phrase information that is extracted by a greater number of times. For example, for the concept ID "yes" having a plurality of ways of saying in Japanese such as "hai", "un" and "sou" (word/phrase information), the CPU 11 creates a recognition grammar by using all the word/phrase information. Whenever the CPU 11 receives a speech input such as "hai" or "un" from the user, the CPU 11 increments the number of times the word/phrase information is used corresponding to the word/phrase information ID, recorded in the word/phrase history database 124.

Thus, when generating a recognition grammar, the CPU 11 refers to the word/phrase history database 124, and can delete word/phrase information ID that is extracted with low frequency from the recognition grammars and reduce the size of recognition grammars. By deleting unnecessary recognition grammars, not only the processing burden is reduced, but also the recognition rate of voice recognition is improved.

In the case where a screen modality is used, similarly, the CPU 11 can delete word/phrase information ID that is extracted with low frequency from the word/phrase information ID when determining a candidate character string. By deleting unnecessary word/phrase information ID from a dropdown list, the user can more easily select a desired character string.

As described above, according to Embodiment 3, it is possible to change the system's way of saying according to the past records of the way of saying used by the user to express a semantic content in a plurality of ways. In other words, by outputting first a way of saying the user has used most recently or a way of saying extracted the greatest number of times by the user in the past, it is possible to change the system's way of saying.

Note that the present invention is not limited to the structure where the dialog control device 1 incorporates the concept word/phrase database 122 and the word/phrase history database 124 as described above, and alternatively, the concept word/phrase database 122 and the word/phrase history database 124 may be stored on another computer accessible over a network.

Embodiment 4

The following description will specifically explain a dialog system according to Embodiment 4 of the present invention based on the drawings. Since the structure of the dialog control device 1 used in the dialog system of Embodiment 4 is the same as that of Embodiment 1, the detailed explanation thereof is omitted by assigning the same codes. Embodiment 4 is characterized by using a process for a predetermined special concept.

In a dialog, for example, a special concept such as numerical values and time is sometimes used. In Embodiments 1 through 3 described above, the dialog control device 1 needs to assign concept ID to all possible values for numerical values and time and store word/phrase information corresponding to each concept ID in the concept word/phrase database 122. However, since the storage means 12 has a physical limitation in terms of the storage capacity, and, from the viewpoint of view of the extraction efficiency of word/phrase information, it is necessary to maintain the concept word/phrase database 122 as a more efficient database.

For example, in the case where a special concept such as numerical values and time is used, it is possible to determine word/phrase information in a general form. Therefore, if the special concept is time, for example, the CPU 11 generates concept ID without storing it in the concept word/phrase database 122, and generates word/phrase information.

More specifically, in the case of a concept showing the time "8:30", for example, the CPU 11 generates the concept ID "time0830". The CPU 11 extracts the word/phrase information "8 o'clock" and "30 minutes" from the concept ID "time0830", and creates the written representation "8:30" and the recognition grammar "eight thirty". Accordingly, it is possible to create a written representation for arbitrary time in 24 hours.

Conversely, by analyzing the written representation "8:30" in the screen modality, the CPU 11 can extract the word/phrase information "8 o'clock" and "30 minutes" and generate the concept ID "time0830".

On the other hand, words/phrases used in a dialog scenario can be classified into general words/phrases such as "yes" and "no" shared by a plurality of services; words/phrases shared by services of the same field, for example, the names of places; and words/phrases used only in a specific service such as proper nouns peculiar to the service. It is preferable that the concept word/phrase database 122 can also be shared for words/phrases which are shared by a plurality of services.

FIG. 16 is a view showing an example of concept ID when the concept word/phrase database 122 is shared. As shown in FIG. 16, concept ID is composed of the above-described concept ID and a name space indicating the category of a concept corresponding to the concept ID. Word/phrase information corresponding to the concept ID is stored as one concept word/phrase database for each name space corresponding to the concept ID.

Figure 17:
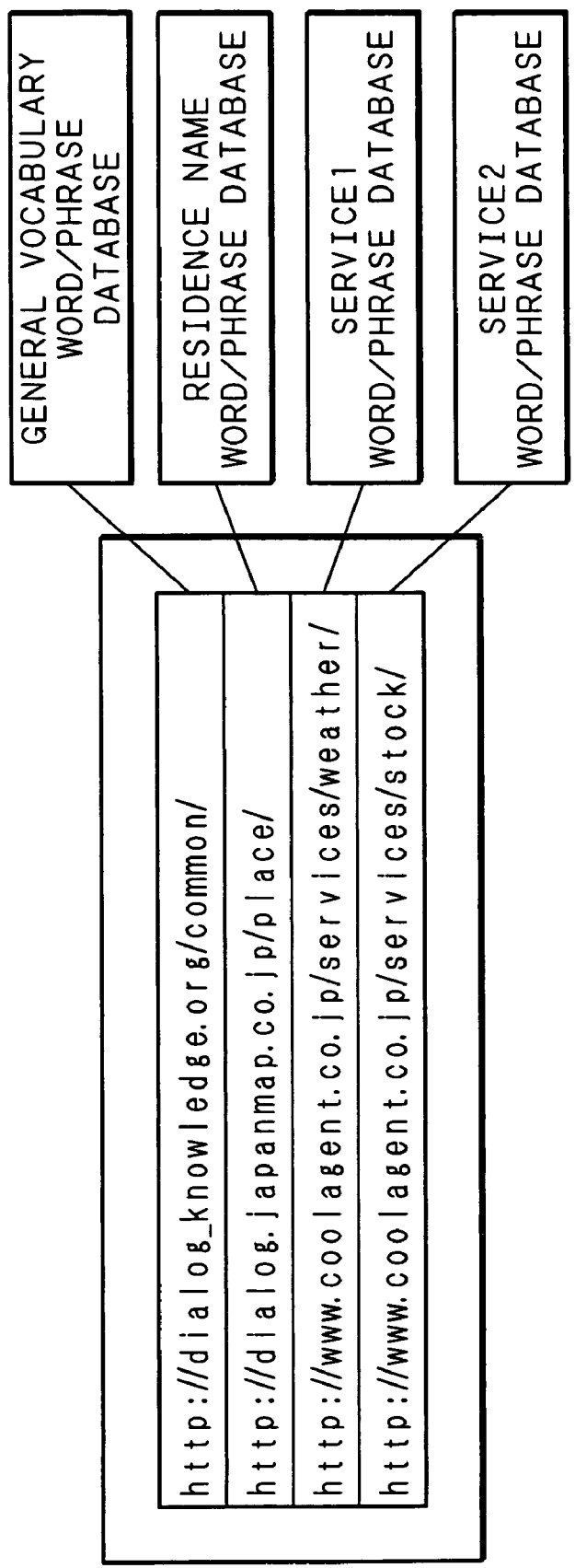
FIG. 17 is a view showing examples of a concept word/phrase database associated with a name space.

The CPU 11 also extracts a name space when extracting concept ID, and selects a concept word/phrase database matching the name space. FIG. 17 is a view showing examples of a concept word/phrase database associated with a name space.

As shown in FIG. 17, the CPU 11 selects a concept word/phrase database matching a name space, extracts word/phrase information from the selected concept word/phrase database, and embodies a dialog scenario. Consequently, in a dialog scenario, words/phrases peculiar to a service supposed by the dialog scenario and general words/phrases can be written together, thereby producing a significant effect of increasing the freedom of writing the dialog scenario.

Note that the present invention is not limited to the structure where the dialog control device 1 incorporates the concept word/phrase database 122 as described above, and alternatively, the concept word/phrase database 122 may be stored on another computer accessible over a network. Accordingly, a plurality of dialog systems can share the concept word/phrase database 122 for a specific purpose over a network.

Further, the above-described dialog system can also be realized on computers of various forms, such as personal computers, PDAs, information appliances, and vehicle-mounted computers. For example, a PDA handles each object such as voice, screen and music, as an individual modality, and allows various applications to be used through voice and screen. For example, an information appliance uses the original function of the apparatus and voice as individual modalities, and can control the operation of the apparatus by voice. For example, a vehicle-mounted computer handles voice, screen and vehicle-mounted devices, such as an audio system and a navigation system, as individual modalities.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A dialog system, comprising:
a word/phrase database that associates a set of one or more words/phrases that are represented according to one or more modalities of a written representation, a voice recognition grammar, or a pronunciation for voice synthesis, with a concept identifier (ID) for identifying a meaning of the word/phrases in the set of words/phrases;
a dialog template storage section storing a dialog template written by using the concept ID for identifying a meaning of input words/phrases in input information and output information for a pursuit of a dialog, said dialog templates specifying fixed portions of output information to be output and changeable portions specified by the concept ID for identifying the meaning of the input words/phrases in the input information, in association with information for identifying the template;
an analyzing section analyzing the input information, including determining a type of modality of the input information, and selecting from the word/phrase database a concept ID as a meaning of the input words/phrase in the input information based upon the type of the modality and a match with a word/phrase in a set of the words/phrases associated with the concept ID; and
an information output section inserting in the dialog template the selected concept ID corresponding to the changeable portions of the dialog template, and outputting the output information along the dialog template.

2. The dialog system of claim 1, wherein a plurality of sets of one or more words/phrases are associated with a concept ID,
the word/phrase database stores history information about a history of selecting a set of words/phrases from the plurality of sets of words/phrases corresponding to a concept ID, and
the analyzing section selects a set of words/phrases associated with a concept ID based on the history information.

3. The dialog system of claim 2, wherein a set of words/phrases that is selected most recently is to be selected based on the history information.

4. The dialog system of claim 2, wherein a set of words/phrases that is selected a greatest number of times is to be selected based on the history information.

5. A dialog execution method for allowing a computer to receive input information to control a pursuit of dialog along a stored scenario, and output information along the dialog scenario, comprising:
associating a set of one or more words/phrases that are represented according to one or more modalities of a written representation, a voice recognition grammar, or a pronunciation for voice synthesis, with a concept identifier (ID) for identifying a meaning of the word/phrases in the set of words/phrases, using a computer processor;

storing a dialog template written by using the concept ID for identifying a meaning of input words/phrases in input information and output information for a pursuit of a dialog, said dialog templates specifying fixed portions of output information to be output and changeable portions specified by the concept ID for identifying the meaning of the input words/phrases in the input information, in association with information for identifying the template;

analyzing the input information, including determining a type of modality of the input information, and selecting from the word/phrase database a concept ID as a meaning of the input words/phrase in the input information based upon the type of the modality and a match with a word/phrase in a set of the words/phrases associated with the concept ID; and inserting in the dialog template the selected concept ID corresponding to the changeable portions of the dialog template, and outputting the output information along the dialog template.

6. A computer memory product storing a computer program for causing a computer to receive input information to control a pursuit of dialog along a stored scenario, and output information along the dialog scenario, said computer program which when executed by a computer, causes the computer to perform operations comprising:

associating a set of one or more words/phrases that are represented according to one or more modalities of a written representation, a voice recognition grammar, or a pronunciation for voice synthesis, with a concept identifier (ID) for identifying a meaning of the word/phrases in the set of words/phrases, using a computer processor;

storing a dialog template written by using the concept ID for identifying a meaning of input words/phrases in input information and output information for a pursuit of a dialog, said dialog templates specifying fixed portions of output information to be output and changeable portions specified by the concept ID for identifying the meaning of the input words/phrases in the input information, in association with information for identifying the template;

analyzing the input information, including determining a type of modality of the input information, and selecting from the word/phrase database a concept ID as a meaning of the input words/phrase in the input information based upon the type of the modality and a match with a word/phrase in a set of the words/phrases associated with the concept ID; and inserting in the dialog template the selected concept ID corresponding to the changeable portions of the dialog template, and outputting the output information along the dialog template.

7. A dialog system, comprising:

a word/phrase database of one or more words/phrases for each word/phrase storing word/phrase information including one or more of a written representation, a voice recognition grammar, or a pronunciation for voice synthesis, in association with information for identifying a meaning of each word/phrase;

a dialog template storage section storing a dialog template written by using the information for identifying the meaning of the words/phrases used in input information and output information for a pursuit of a dialog, said dialog templates specifying fixed portions of output information to be output and changeable portions specified by the information for identifying the meaning of the words/phrases, in association with information for identifying the template;

an information receiving section receiving the input information;

an analyzing section analyzing the input information and extracting a word/phrase including the meaning of the extracted word/phrase, based upon the word/phrase information;

a dialog control section controlling the pursuit of dialog along the stored dialog templates; and an information output section inserting the words/phrases corresponding to the changeable portions of the dialog template based on both the information for identifying the dialog template and the information for identifying the meaning of the words/phrases, and outputting the output information along the dialog template, based on the extracted word/phrase, wherein history information about a history of a word/phrase selected from the plurality of words/phrases corresponding to the information for identifying the meaning of words/phrases is stored, in case that a plurality of words/phrases are stored in association with information for identifying the meaning of words/phrases, and a word/phrase corresponding to the information for identifying the meaning of words/phrases is selected based on the history information.

8. A dialog execution method for allowing a computer to receive input information to control a pursuit of dialog along a stored scenario, and output information along the dialog scenario, comprising:

storing one or more words/phrases, for each word/phrase storing word/phrase information including one or more of a written representation, a voice recognition grammar, or a pronunciation for voice synthesis, in association with information for identifying a meaning of each word/phrase;

storing a dialog template written by using the information for identifying the meaning of the words/phrases used in input information and output information for a pursuit of a dialog, said dialog templates specifying fixed portions of output information to be output and changeable portions specified by the information for identifying the meaning of the words/phrases, in association with information for identifying the template;

analyzing the input information and extracting a word/phrase including the meaning of the extracted word/phrase, based upon the word/phrase information;

inserting the words/phrases corresponding to the changeable portions of the dialog template based on both the information for identifying the dialog template and the information for identifying the meaning of the words/phrases, and outputting the output information along the dialog template, based on the extracted word/phrase; and storing history information about a history of a word/phrase selected from the plurality of words/phrases corresponding to the information for identifying the meaning of words/phrases, in case that a plurality of words/phrases are stored in association with information for identifying the meaning of words/phrases, and selecting a word/phrase corresponding to the information for identifying the meaning of words/phrases based on the history information.

9. A computer memory product storing a computer program for causing a computer to receive input information to control a pursuit of dialog along a stored scenario, and output information along the dialog scenario, said computer program which when executed by a computer, causes the computer to perform operations comprising:

storing one or more words/phrases, for each word/phrase storing word/phrase information including one or more of a written representation, a voice recognition grammar, or a pronunciation for voice synthesis, in association with information for identifying a meaning of each word/phrase;

a dialog template written by using the information for identifying the meaning of the words/phrases used in input information and output information for a pursuit of a dialog, said dialog templates specifying fixed portions of output information to be output and changeable portions specified by the information for identifying the meaning of the words/phrases in association with information for identifying the template;

analyzing the input information and extracting a word/phrase including the meaning of the extracted word/phrase, based upon the word/phrase information;

inserting the words/phrases corresponding to the changeable portions of the dialog template based on both the information for identifying the dialog template and the information for identifying the meaning of the words/phrases, and outputting the output information along the dialog template, based on the extracted word/phrase; and storing history information about a history of a word/phrase selected from the plurality of words/phrases corresponding to the information for identifying the meaning of words/phrases, in case that a plurality of words/phrases are stored in association with information for identifying the meaning of words/phrases, and selecting a word/phrase corresponding to the information for identifying the meaning of words/phrases based on the history information.

* * * * *